F. W. PEPPER.
BAKING CONE.
APPLICATION FILED JAN. 27, 1916.
1,224,564.
Patented May 1, 1917.
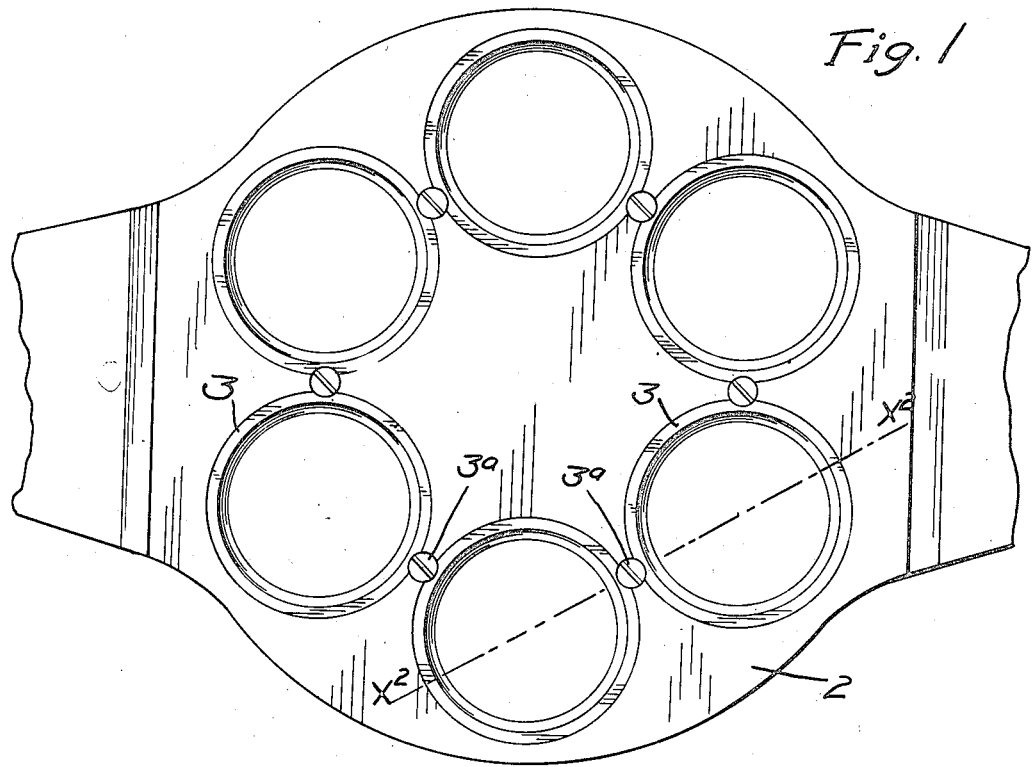
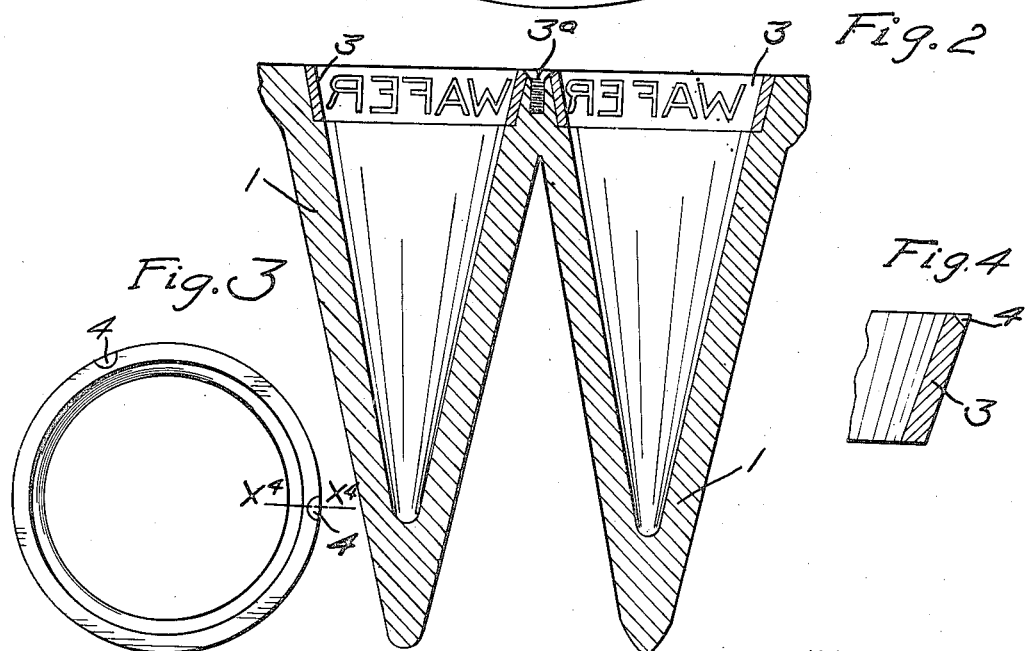
WITNESSES
G. F. Williamson
E. C. Skinkle
INVENTOR
FREDERICK W. PEPPER
BY HIS ATTORNEYS

UNITED STATES PATENT OFFICE.

FREDERICK W. PEPPER, OF MINNEAPOLIS, MINNESOTA, ASSIGNOR TO STANDARD BAKING COMPANY, OF MINNEAPOLIS, MINNESOTA, A CORPORATION OF MINNESOTA.

BAKING-CONE.

1,224,564.

Specification of Letters Patent.    Patented May 1, 1917.

Application filed January 27, 1916. Serial No. 74,595.

*To all whom it may concern:*

Be it known that I, FREDERICK W. PEPPER, a citizen of the United States, residing at Minneapolis, in the county of Hennepin and State of Minnesota, have invented certain new and useful Improvements in Baking-Cones; and I do hereby declare the following to be a full, clear, and exact description of the invention, such as will enable others skilled in the art to which it appertains to make and use the same.

My invention relates to molds for the baking of dough in the form of ice cream cones or similar receptacles, and has for its object to provide in the concave baking cone, removable and interchangeable branding devices.

In the baking of ice cream cones, it is the custom to provide molds with concave or conical cavities, and to insert plunger-like cones within the same, but spaced therefrom to form the cavity for the cone to be baked between the same. It is very desirable that a concern having for its business the baking of cones for different retailers, should imprint, emboss, or otherwise form on the cones, in the process of baking thereof, letters, characters or figures representing the name, trade-mark, or the like, of the particular retailer for whom the cones are made. For the sake of economy, it is not at all desirable that different and distinct cone baking devices be provided for each retailer or customer.

In practice, I have accomplished the above noted object in a very simple, efficient and economical manner by providing the conical receptacles or molds with removable and interchangeably usable branding devices, each having the figures, characters or marks representing the name or trade-mark of some particular retailer or customer. These branding devices are preferably in the form of rings set in flush with the upper or outer portions of the conical molds.

In the accompanying drawings which illustrate the invention, like characters indicate like parts throughout the several views.

Referring to the drawings:

Figure 1 is a plan view showing a plurality of cone baking molds formed integral with a common head or member and having the branding rings applied therein in accordance with my invention;

Fig. 2 is a section taken on the line $x^2 x^2$ of Fig. 1;

Fig. 3 is a plan view showing one of the branding rings removed; and

Fig. 4 is a fragmentary section on the line $x^4 x^4$ of Fig. 3.

The conical molds 1, as shown, are cast integral with the plate or member 2, and are circumferentially spaced, their flaring upper portions closely positioned.

The branding rings 3 are tapered so that their inner surfaces continue the conical interior of the molds, and they are countersunk into the upper portion of the said mold. The molds are customarily made of cast iron. Preferably, the branding rings 3 are made of copper or brass, which metals have a greater heat expansion than cast iron. This greater expansion of the branding rings than the metal of the mold is important because it permits the branding rings to be made of such size that they may be easily placed in working position in the mold, or removed therefrom when cool, and which will, nevertheless, be very tightly seated when subjected to the baking heat.

As a simple and efficient means for positively securing the branding rings in the molds, even when cold, small screws 3 are screwed into the threaded seats formed in the plate 2 between the adjacent molds, and having countersunk heads that engage notches 4 formed in the upper edges of the said branding rings.

In the arrangement illustrated, six molds with branding rings are in circular arrangement and these rings are held in position by a corresponding number of screws. The letters or characters on the inner surfaces of the branding rings are preferably made by engraving or incutting thereof, but in some instances they might be made to project from the rings. The taper of the ring is such that the letters or characters will draw readily from the baked cone, which latter will contract somewhat in cooling and is more or less flexible.

The branding rings for several molds may be interchangeable with each other, or with other rings having different markings thereon.

What I claim is:

1. A baking mold having an approximately conical inner surface, and provided with a branding ring set in flush with the outer extremity thereof, and detachably seated therein.

2. A baking mold having a detachable tapered branding ring set in flush with the open extremity thereof and detachably seated therein so as to bind when heated, the said branding ring being of a metal that has a greater heat expansion than the body of said mold.

3. A baking mold that is approximately circular in cross-section, provided at one end with a detachable annular branding ring.

4. A baking mold that is approximately circular in cross-section, having a detachable branding ring set in flush with the open extremity thereof and detachably seated therein, so as to bind when heated, the said branding ring being of a metal that has a greater heat expansion than the body of said mold.

In testimony whereof I affix my signature in presence of two witnesses.

FREDERICK W. PEPPER.

Witnesses:
F. D. MERCHANT,
HARRY D. KILGORE.